United States Patent
Lee et al.

(10) Patent No.: US 8,391,554 B2
(45) Date of Patent: Mar. 5, 2013

(54) EYE DETECTION SYSTEM USING A SINGLE CAMERA

(75) Inventors: Jin-Woo Lee, Rochester Hills, MI (US); Kwang-Keun Shin, Rochester Hills, MI (US); Jihan Ryu, Rochester Hills, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1190 days.

(21) Appl. No.: 12/243,088

(22) Filed: Oct. 1, 2008

(65) Prior Publication Data

US 2010/0080416 A1    Apr. 1, 2010

(51) Int. Cl.
*G06K 9/00* (2006.01)
(52) U.S. Cl. ................ 382/104; 382/103; 180/271
(58) Field of Classification Search .......... 382/103–104; 180/271

See application file for complete search history.

(56) References Cited

U.S. PATENT DOCUMENTS

| | | | | |
|---|---|---|---|---|
| 4,625,329 A | * | 11/1986 | Ishikawa et al. | 382/104 |
| 4,843,892 A | * | 7/1989 | Krist | 73/865.4 |
| 5,293,427 A | * | 3/1994 | Ueno et al. | 382/103 |
| 6,005,958 A | * | 12/1999 | Farmer et al. | 382/103 |
| 6,324,453 B1 | * | 11/2001 | Breed et al. | 701/45 |
| 6,501,536 B1 | * | 12/2002 | Fredricks | 356/3.01 |
| 7,415,126 B2 | * | 8/2008 | Breed et al. | 382/100 |
| 7,570,785 B2 | * | 8/2009 | Breed | 382/100 |
| 7,788,008 B2 | * | 8/2010 | Breed | 701/45 |
| 7,970,175 B2 | * | 6/2011 | Malawey et al. | 382/103 |
| 2002/0110261 A1 | * | 8/2002 | Yanai | 382/104 |
| 2004/0202353 A1 | * | 10/2004 | Doi et al. | 382/115 |
| 2005/0179524 A1 | * | 8/2005 | Saito et al. | 340/425.5 |
| 2007/0291140 A1 | * | 12/2007 | Baba et al. | 348/240.99 |
| 2007/0291989 A1 | * | 12/2007 | Ito et al. | 382/103 |
| 2007/0292001 A1 | * | 12/2007 | Baba et al. | 382/118 |
| 2008/0021616 A1 | * | 1/2008 | Aoki et al. | 701/45 |
| 2008/0226175 A1 | * | 9/2008 | Suzuki et al. | 382/190 |
| 2008/0239527 A1 | * | 10/2008 | Okabe et al. | 359/843 |
| 2010/0014759 A1 | * | 1/2010 | Suzuki et al. | 382/195 |

* cited by examiner

*Primary Examiner* — Jingge Wu
(74) *Attorney, Agent, or Firm* — John A. Miller; Miller IP Group, PLC

(57) ABSTRACT

A system and a method for detecting the eyes of a driver of a vehicle using a single camera. The method includes determining a set of positional parameters corresponding to a driving seat of the vehicle. The camera is positioned at a pre-determined location inside the vehicle, and a set of parameters corresponding to the camera is determined. The location of the driver's eyes is detected using the set of positional parameters, an image of the driver's face and the set of parameters corresponding to the camera.

19 Claims, 2 Drawing Sheets

EYE DETECTION SYSTEM USING A SINGLE CAMERA

BACKGROUND OF THE INVENTION

1. Field of the Invention

This invention relates generally to a system and method for detecting the eyes of a driver of a vehicle and, more particularly, to a system and method for detecting the eyes of a driver of a vehicle using a single camera.

2. Discussion of the Related Art

Driver safety and comfort has always been an area of concern for vehicle manufacturing companies. Vehicle manufacturing companies invest heavily in the development of vehicle safety systems. In recent years, there has been significant effort in developing a driver cognizance and assistance (DCA) system to assist a driver during various operational conditions of the vehicle thereby reducing stress level and increasing the comfort level of the driver. Some of the existing vehicles include variations of the DCA system, which require a manual input for initialization. For example, several existing systems allow the driver to adjust the rear-view mirrors using a keypad. However, this can be inconvenient to the driver in some situations. For example, if, while driving a vehicle, the driver changes his seating posture, all of the rear-view mirrors will have to be adjusted accordingly, which may be inconvenient for the driver and might even lead to accidents.

One known system attempts to solve the above mentioned problems by using a pair of cameras for detecting the eyes of the driver. The cameras are located on the dashboard of the vehicle in front of the driver, and take pictures of the driver's face. Image processing is performed to identify the location of the eyes of the driver. The eye location can then be used for DCA initialization to perform automatic adjustment of various vehicle components, such as the rear-view mirrors. Further, the eye location can be used for driver drowsiness detection. However, the use of two single cameras adds to the cost of the vehicle since another camera is required in addition to the one already present as a part of the on-board DCA system. Further, use of two cameras adds to the image processing time, further affecting the DCA initialization time.

SUMMARY OF THE INVENTION

In accordance with the teachings of the present invention, a system and a method for detecting the eyes of a driver of a vehicle using a single camera are disclosed that has can be used in driver cognizance and assistance (DCA) systems, automatic seat position adjustment system, and power adjustable mirrors. The method includes determining a set of positional parameters corresponding to a driving seat of the vehicle. The camera is positioned at a pre-determined location inside the vehicle, and a set of parameters corresponding to the camera is determined. The location of the driver's eyes is detected using the set of positional parameters, an image of the driver's face and the set of parameters corresponding to the single camera.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for detecting the eye of a driver of a vehicle using a single camera is merely exemplary in nature, and is in no way intended to limit the invention or its applications or uses. For example, the system and method for detecting the eyes of a driver of a vehicle using a single camera of the invention has application in DCA systems, automatic seat position adjustment system, and power adjustable mirrors. However, as will be appreciated by those skilled in the art, the system and method of the invention may have other applications.

Figure 1:
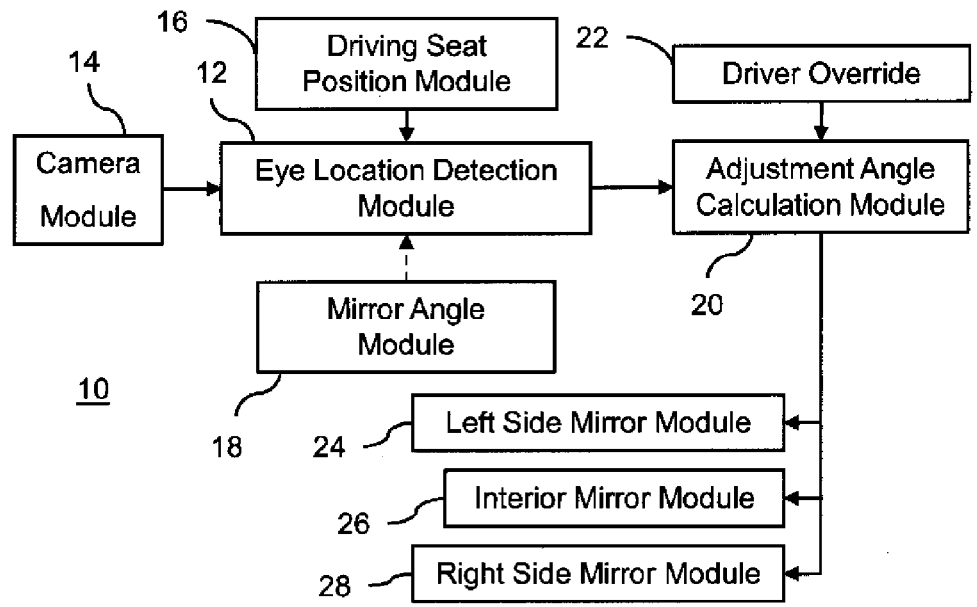
FIG. 1 illustrates a block diagram of a system for detecting an eye location of a driver in a driving seat of a vehicle.

FIG. 1 is a block diagram of a system 10 for determining the location of a driver's eyes and head, according to an embodiment of the present invention. The system 10 includes an eye location detection module 12 that receives inputs from a plurality of devices to determine the location of the driver's eyes, as described below. For example, the module 12 receives processed single camera images of the vehicle driver from a camera module 14 including a camera; position signals from position sensors on the driver seat, such as a driving seat inclination sensor and a driving seat position sensor, from a driving seat position module 16; and side-mirror angle position signals from a mirror angle module 18. In one embodiment, the module 12 calculates the location of the driver's eyes based on the inputs from the module 14 and the module 16. In another embodiment, the module 12 calculates location of the driver's eyes based on the inputs from the module 14 and the module 18.

Thereafter, the module 12 sends the location of the driver's eyes to an adjustment angle calculation module 20. The module 20 calculates the mirror-adjustment angles for each of the rear-view mirrors by which each rear-view mirror has to be displaced from the current position, based on the location of the driver's eyes. The calculated mirror-adjustment angles are then transmitted to the respective rear-view mirror modules, such as left side mirror module 24, interior mirror module 26 and right side mirror module 28 that adjust the respective rear-view mirrors in to a new position based on the calculated mirror-adjustment angles. There is a possibility that the driver does not desire the automatic adjustment of the rear-view mirrors. For this purpose, the system 10 includes a driver override system 22 that enables the driver to prevent the adjustment angle calculation module 20 to transmit the calculated adjustment angles to the modules 24, 26 and 28.

Figure 2:
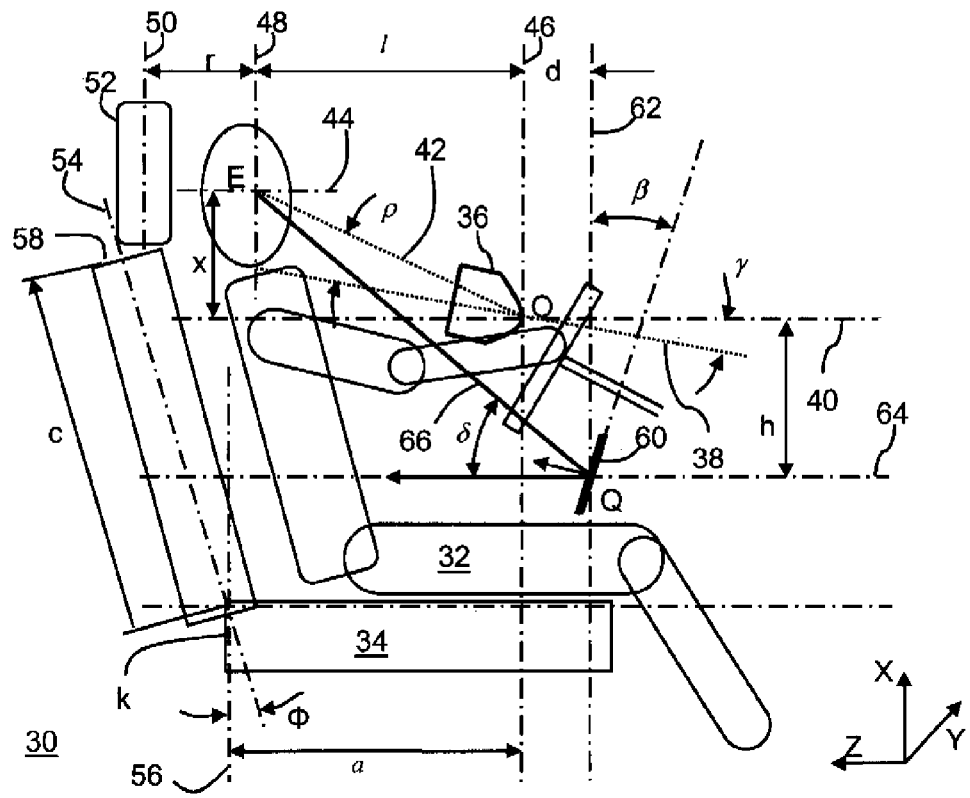
FIG. 2 illustrates a side-view of a driver in a driving seat of a vehicle.

FIG. 2 illustrates a side-view 30 of a driver 32 seated in a driving seat 34 of a vehicle, according to an embodiment of the present invention. The figure shows the geometric relationship between various components of the vehicle that are used to detect the driver's eyes based on one or more positional parameters corresponding to an eye location E of the driver 32. For this purpose, the vehicle includes a camera module, such as the module 14, including a single camera 36 mounted on a surface in front of the driver 32 that records images of the face of the driver 32. In one embodiment, the camera 36 is mounted on a dashboard of the vehicle. The center line 38 of the camera 36 is shown to pass through center-point O of the camera 36. Further, line 40 lies in the Y-Z plane, along the Z axis and passes through the center-point O of the camera 36. The angle γ between lines 38 and 40 is the tilt angle of the camera 36. In one embodiment, the tilt angle γ of the camera 36 can be determined using a tilt angle sensor (not shown) included in the camera the module 14, that can measure the angle of tilt in the X-Z plane. The location of the camera 36 can be pre-determined based on a known profile of the interior of the vehicle.

Figure 3:
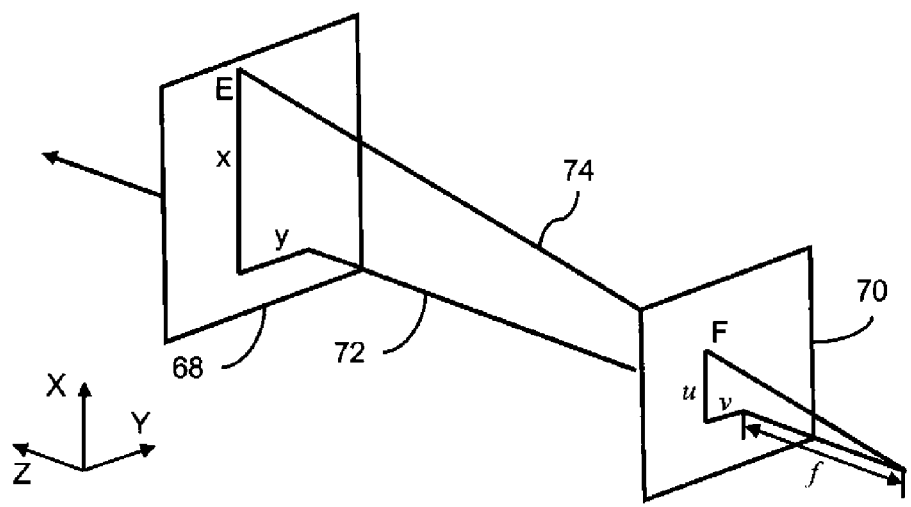
FIG. 3 illustrates a first plane containing an eye location of a driver of a vehicle and a second plane containing an image formed by an single camera.

Line 42 joins the center-point O and the eye location E of the driver 32. Angle ρ is the angle between the lines 38 and 42 can be calculated as discussed below. Further, line 44 lies in a plane parallel to the Y-Z plane, along the Z axis, and passes through the eye location E of the driver 32. The distance x between lines 44 and 40 is the vertical distance between the eye location E and the center-point O, along the axis X. The distance y represents the distance between the eye location E and the center-point O along the Y axis, as shown in FIG. 3. The distances x and y can be calculated as illustrated later in conjunction with the description of FIG. 3.

Line 46 lies in the X-Z plane, along the X axis and passes through the center-point O of the camera 36. Line 48 lies in a plane parallel to the X-Z plane, along the X axis and passes through the eye location E. The distance between the eye location E and the center-point O, along the Z axis, is represented by l. Line 50 lies in the X-Z plane and passes through the center of a seat head-rest 52 of the driving seat 34. The distance between lines 48 and 50, along the Z axis, is represented by r, which is the distance of the eye location E from the center of the head-rest 52. In one embodiment, the distance r can be a pre-determined distance based on a known profile of the driving seat 34.

Line 54 lies in the X-Z plane and passes through the center of a back-rest 58 of the driving seat 34. Further, line 56 lies in a plane parallel to the X-Z plane and passes through edge k, which is along the X axis and connected to the back-rest 58. The angle between lines 54 and 56 is represented by ϕ which is the tilt angle of the back-rest 58 of the driving seat 34. The tilt angle ϕ can be determined using a driving seat inclination sensor (not shown) included in a driving seat position module located in the driving seat 34, such as the module 16, that can measure the angle of inclination of the back-rest 58 in the X-Z plane. Further, the distance between lines 46 and 56 is represented by a, which is the distance of the center-point O from the edge k. In one embodiment, the distance a can be determined using a driving seat position sensor (not shown) included in the module 16. Further, the length of the back-rest 58 is represented by length c, which is the distance between the edges of the back-rest 58 in the X-Z plane. In one embodiment, the length c can be a pre-determined length. In another embodiment, the length c can be a variable which can be measured using a position sensor (not shown) included in the module 16. Using the positional parameters of the driving seat 34, namely a, r, c and ϕ, the distance l, i.e., the distance between the eye location E and the center-point O along the Z axis, can be calculated by equation (1).

$$l = a - r + c \sin \phi \quad (1)$$

FIG. 2 also illustrates a side rear-view mirror 60. Line 62 is the center line of the side rear-view mirror 60 and lies in a plane parallel to the X-Z plane, along the X axis. Further, line 62 passes through the center Q of the side rear-view mirror 60. The mirror tilt angle β of the side rear-view mirror 60, in the X-Z plane, is the angle between the lines 62 and 64. The line 64 passes through the center Q of the side rear-view mirror 60 and lies in the X-Z plane, along the X axis. Further, line 64 lies in a plane parallel to the Y-Z plane and passes through the center Q. The distance between lines 40 and 64 is represented by length h which is the distance between the center-point O and the center Q, along the X axis. Further, the distance between the center Q and center-point O, along the Z axis, is represented by length d, which is the distance between the lines 46 and 62. Line 66 joins the eye location E and the center Q, where the angle between lines 64 and 66 is defined as δ, which is the head position angle subtended by the side rear-view mirror 60 at the eye location E, in the X-Z plane.

FIG. 3 illustrates a first plane 68 containing the eye location E of the driver 32 of the vehicle and a second plane 70 containing an image recorded by the camera 36. Both the first plane 68 and the second plane 70 lie parallel to the X-Y plane. After the image of the face of the driver 32 has been recorded by the camera 36, image processing is performed by the camera module 14 on the recorded image to locate the position of the eye of the driver 32 in the image, corresponding to the eye location E, which is represented by F in FIG. 3. For this purpose the image processing module is included in the camera module 14 and the image processing can be achieved by using any of the several existing image processing techniques.

In the second plane 70, i.e., the plane of the recorded image, F represents the location of an image of the eye. The distance between the location E of the eye in the second plane 70 and the line 72, along the Y axis, is defined by v. Further, the distance between the location E of the eye in the second plane 70 and the line 74, along the X axis, is defined by u. Additionally, the focal length of the camera 36 is represented by f. Using the parameters u, v, f, x, y and l, the relationship between the location E of the eye on the second plane 70 and the actual location of the eye E can be calculated by the camera the module 14 using equations (2) and (3).

$$x = \frac{u}{f} \cdot l \quad (2)$$

$$y = \frac{v}{f} \cdot l \quad (3)$$

The actual location of the eye E with respect to the camera 36 can be defined by the angle ρ, which is the angle subtended by the camera 36 at the eye location E. Further, using equations (1), (2) and (3), and the geometric relationship between various components, ρ can be calculated by the eye location detection module 12 using equation (4).

$$\rho = \tan^{-1}\left(\frac{u}{\sqrt{v^2 + f^2}}\right) - \gamma \quad (4)$$

Further, using the parameters ρ, l, γ, h and d, the angle δ can be calculated by the module 12 using equation (5).

$$\delta = \tan^{-1}\left(\frac{l \cdot \tan(\rho + \gamma) + h}{l + d}\right) \quad (5)$$

Figure 4:
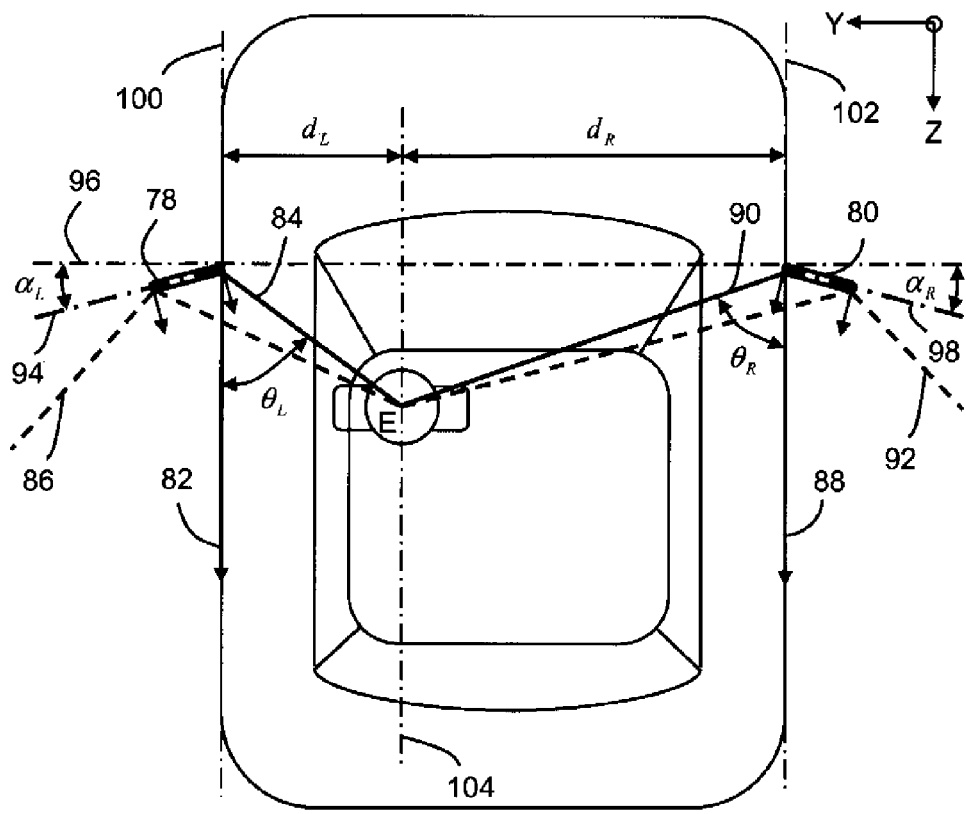
FIG. 4 illustrates a top view of a vehicle with a driver in the driving seat.

FIG. 4 is a top view of a vehicle 76 with the driver 32 in the driving seat 34. The vehicle 76 includes a left side rear-view mirror 78 and a right side rear-view mirror 80 and their corresponding geometric relationship with the eye location E. The mirror tilt angle of the left side rear-view mirror 78, in the Y-Z plane, is represented by $\alpha_L$, hereinafter referred to as the left side rear-view mirror angle. The mirror tilt angle $\alpha_L$ is defined by the lines 94 and 96, where the line 94 represents the center line of the left side rear-view mirror 78, in the Y-Z plane.

The line 96 lies in a plane parallel to the Y-Z plane and passes through both the points at which the left side rear-view mirror 78 and the right side rear-view mirror 80 are attached to the vehicle 76. In a similar manner, the mirror tilt angle of the right side rear-view mirror 80 is represented by $\alpha_R$, hereinafter referred to as the right side rear-view mirror angle. The mirror tilt angle $\alpha_R$ is defined by the lines 96 and 98, where the line 98 represents the center line of the right side rear-view mirror 78 in the Y-Z plane.

The angle between the lines 82 and 84 is represented by $\theta_L$, which is the head position angle subtended by the eye location E at the edge of the left side rear-view mirror 78, which is attached with the body of the vehicle 76. Further, the rear-viewing zone of the left side rear-view mirror 78 is defined by the lines 84 and 86. In a similar manner, the head position angle subtended by the eye location E at the edge of the right side rear-view mirror 80 is defined by $\theta_R$, which is the angle between the lines 88 and 90. Also, the rear-viewing zone of the right side rear-view mirror 80 is defined by the lines 88 and 92.

The line 104 lies in the Y-Z plane and passes through the eye location E along the Z axis. Further, the lines 100 and 102 lie in the Y-Z plane and pass along the edge of the side rear-view mirror 78 and 80, which is attached with the body of the vehicle 76. The distance along the Y axis between the eye location E and the edge of the left side rear-view mirror 78, which is attached with the body of the vehicle 76, is represented by $d_L$, which is the distance between the lines 100 and 104. In a similar manner, the distance, along the Y axis, between the eye location E and the edge of the right side rear-view mirror 80 is represented by $d_R$, which is the distance between the lines 102 and 104.

The present invention provides a technique for automatic adjustment of the left side rear-view mirror 78 and the right side rear-view mirror 80 to adjust the rear-viewing zones. For this purpose, the technique uses the actual eye location E calculated earlier.

Using the eye location E and the parameters $d_R$, $d_L$, l and d, the head position angles in the Y-Z plane, $\theta_L$ and $\theta_R$ can be calculated by the module 12 using equations (6) and (7).

$$\theta_R = \tan^{-1}\left(\frac{d_R}{l+d}\right) \qquad (6)$$

$$\theta_L = \tan^{-1}\left(\frac{d_L}{l+d}\right) \qquad (7)$$

Using the head position angles $\theta_L$, $\theta_R$ and $\delta$, the mirror tilt angles $\alpha_L$ and $\alpha_R$ in the Y-Z plane, and the mirror tilt angle $\beta$ in the X-Z plane, can be calculated by a calculation module, such as the adjustment angle calculation module 20, using equations (8), (9) and (10).

$$\alpha_L = \frac{\theta_L}{2} \qquad (8)$$

$$\alpha_R = \frac{\theta_R}{2} \qquad (9)$$

$$\beta = \frac{\delta}{2} \qquad (10)$$

Based on the calculated mirror tilt angles calculated by the module 20, both the left side rear-view mirror 78 and the right side rear-view mirror 80 can be adjusted so as to minimize the blind spots, thus allowing the driver 32 to have the widest possible rear-viewing zone. This will increase the comfort level of the driver 32. Additionally, this technique will reduce the chances of a mishap. In one embodiment, a rear-view mirror module, one in each of the side rear-view mirror 78 and 80, such as the modules 24 and 28, can be used for the purpose of adjustment. Further, the interior rear-view mirror (not shown) can be adjusted using the module 26. The rear-view mirror modules 24, 26 and 28 can include a position controller, such as a stepper motor, which can be used to set the side rear-view mirrors 78 and 80 and the interior rear-view mirror to the calculated mirror tilt angles, and hence a rear-viewing position based on the eye location E. Further, the eye location E can be used for the purpose of detecting the gaze of the driver and also for detecting a driver drowsiness condition, which can again help in avoiding accidents. Additionally, the gaze detection can be used to activate the DCA system. For this purpose, a gaze detection sub-module can be present in the camera module 14. Also, for detecting drowsiness, the camera module 14 can have a drowsiness detection sub-module.

In one embodiment, there may be no sensors in the driving seat 34 and hence, the values of the positional parameters for the driving seat 34, namely a, r, c and $\phi$ cannot be obtained. However, in such a scenario, the distance l can be calculated using the positional parameters of the side rear-view mirrors 78 and 80, namely, $\delta$, $d_R$, $d_L$, $\theta_L$ and $\theta_R$. The head position angles $\theta_L$ and $\theta_R$ can be obtained using the modules 24 and 28 to determine the head position angles in the Y-Z plane as calculated by the module 12 using equation (11).

$$l = \left(\frac{d_L - d\tan(\theta_L)}{\tan(\theta_L)}\right) = \left(\frac{d_R - d\tan(\theta_R)}{\tan(\theta_R)}\right) \qquad (11)$$

Further, the head position angle $\delta$ can be obtained using the side rear-view mirror angle measuring sensor for sensing the head position angle of the side rear-view mirrors 78 and 80 in the X-Z plane. Hence, the angle subtended by the camera 36 at the eye location E, the angle $\rho$ can be calculated by the module 12 using equation (12).

$$\rho = \tan\left(\frac{(l+d)\tan(\delta) - h}{l}\right) - \gamma \qquad (12)$$

Further, the angle $\rho$ can be calculated from the image of the face of the driver 32 using image processing techniques. Also, using FIG. 3, equations (2) and (3) and the geometric relationship between various components of the vehicle the actual eye location E can be calculated by the module 12. Further, the actual eye location E can be used to perform driver drowsiness detection, increasing the safety of the driver 32. Further, the actual eye location E can be used to activate the DCA system, thus increasing the comfort level of the driver 32.

Various embodiments of the present invention offer one or more advantages. The present invention provides a system and method for detecting the location of the eyes of the driver of a vehicle using a single camera. The location of the eyes can be used for automatic adjustment of the rear-view mirrors. The location of the eyes can further be used for detecting driver drowsiness condition and hence, aid in driver safety.

Furthermore, the location of the eyes can be used for activating the DCA system that will increase the comfort of the driver.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting the location of at least one eye of a driver positioned in a driving seat of a vehicle using a single camera positioned inside the vehicle, said method comprising:
   determining a set of positional parameters corresponding to the driving seat, where said set of positional parameters includes an angle between a back-rest of the driving seat and a vertical plane, a distance between an edge of the driving seat and a center of the camera and a length of the back-rest of the driving seat;
   determining a set of parameters corresponding to the camera, wherein the set of parameters corresponding to the camera includes a focal length of the camera, an angle between the camera and a vertical plane and one or more positional parameters of the camera based on a known profile of an interior of the vehicle;
   capturing an image of a face of the driver using the camera; and
   detecting the eye location based on the set of positional parameters, the image of the face and the set of parameters corresponding to the camera.

2. The method according to claim 1 wherein the set of positional parameters is determined using sensors in the driving seat.

3. The method according to claim 1 wherein the set of parameters corresponding to the camera is determined using sensors.

4. The method according to claim 1 wherein detecting the eye location includes processing the image to detect the eye location in the image and correlating the eye location in the image with the set of positional parameters and the set of parameters corresponding to the camera.

5. The method according to claim 1 further comprising calculating the eye location using the equation:

$$\rho = \tan^{-1}\left(\frac{u}{\sqrt{v^2+f^2}}\right) - \gamma$$

where ρ is an angle subtended by the eye location at a center of the camera, u and v are positional parameters of the eye location in the image of the face, γ is a tilt angle of the camera and f is a focal length of the camera.

6. A method for detecting the location of at least one eye of a driver of a vehicle using a single camera positioned inside the vehicle, said method comprising:
   determining a set of positional parameters corresponding to a first rear-view mirror of one or more rear-view mirrors, where the set of positional parameters includes an angle between a center of a head of the driver and the first rear-view mirror in a horizontal plane, an angle between the center of the head of the driver and the first rear-view mirror in a vertical plane, a distance between the center of the head of the driver and the first rear-view mirror in the horizontal plane, measured along a direction perpendicular to a direction of motion of the vehicle and a center of the camera and a distance between the center of the camera and the first rear-view mirror in the horizontal plane, measured along a direction of motion of the vehicle;
   determining a set of parameters corresponding to the camera;
   capturing an image of a face of the driver using the camera; and
   detecting the eye location based on the set of positional parameters, the image of the face and the set of parameters corresponding to the camera.

7. The method according to claim 6 wherein the set of positional parameters is determined using sensors.

8. The method according to claim 6 wherein the set of parameters corresponding to the camera includes a focal length of the camera, an angle between the camera and a vertical plane and one or more positional parameters of the camera based on a known profile of an interior of the vehicle.

9. The method according to claim 6 wherein the set of parameters corresponding to the camera is determined using sensors.

10. The method according to claim 6 wherein detecting the eye location comprises processing the image to detect the eye location in the image and correlating the eye location in the image with the set of positional parameters and the set of parameters corresponding to the camera.

11. The method according to claim 6 further comprising calculating the eye location using the equation:

$$\rho = \tan\left(\frac{(l+d)\tan(\delta)-h}{l}\right) - \gamma$$

where ρ is an angle subtended by the eye location at a center of the camera, l is a distance of the eye location from the center of the camera, d is a pre-determined distance of the center of the camera from a center of the first rear-view mirror wherein l and d are measured along a direction of motion of the vehicle, δ is a head position angle subtended by the first rear-view mirror at the eye location in a plane parallel to the direction of motion of the vehicle and perpendicular to the floor of the vehicle, h is a pre-determined distance between the center of the camera and a center of the first rear-view mirror measured along a direction perpendicular to the direction of motion of the vehicle and in a plane parallel to the plane containing δ, and γ is an angle of tilt of the camera in the plane containing δ.

12. A system for detecting the location of at least one eye of a driver positioned in a driving seat of a vehicle, said system comprising:
   a driving seat position module for determining a first set of positional parameters corresponding to the driving seat, where said driving seat position module includes a driving seat inclination sensor to measure an angle between a back-rest of the driving seat and a vertical plane and a driving seat position sensor to measure a distance between an edge of the driving seat and a center of the camera;
   a camera module for determining a set of parameters corresponding to a camera, where said camera module includes a camera position sensor to measure an angle between the camera and a vertical plane;

a rear-view mirror module for determining a second set of positional parameters corresponding to at least one rear-view mirror; and an eye location detection module for detecting the eye location based on an image from the camera, the set of parameters corresponding to the camera and at least one of the first set of positional parameters and the second set of positional parameters.

13. The system according to claim 12 wherein the camera position sensor measures an angle between the camera and a horizontal plane of the vehicle.

14. The system according to claim 12 wherein the rear-view mirror module includes a position controller to re-position the at least one rear-view mirror based on the eye location.

15. The system according to claim 12 wherein the eye location detection module includes an image processing module, the image processing module processing the image to detect the eye location in the image.

16. The system according to claim 12 wherein the image processing module includes a gaze detection sub-module for performing gaze detection of the driver by identifying a pupil of the at least one eye based on the eye location and a drowsiness detection sub-module for detecting drowsiness condition of the driver based on the eye location.

17. A method for detecting the location of at least one eye of a driver positioned in a driving seat of a vehicle using a single camera positioned inside the vehicle, said method comprising:

determining a set of positional parameters corresponding to the driving seat;

determining a set of parameters corresponding to the camera;

capturing an image of a face of the driver using the camera;

detecting the eye location based on the set of positional parameters, the image of the face and the set of parameters corresponding to the camera; and calculating the eye location using the equation:

$$\rho = \tan^{-1}\left(\frac{u}{\sqrt{v^2 + f^2}}\right) - \gamma \quad (4)$$

where $\rho$ is an angle subtended by the eye location at a center of the camera, u and v are positional parameters of the eye location in the image of the face, $\gamma$ is a tilt angle of the camera and f is a focal length of the camera.

18. A method for detecting the location of at least one eye of a driver of a vehicle using a single camera positioned inside the vehicle, said method comprising:

determining a set of positional parameters corresponding to a first rear-view mirror of one or more rear-view mirrors;

determining a set of parameters corresponding to the camera;

capturing an image of a face of the driver using the camera;

detecting the eye location based on the set of positional parameters, the image of the face and the set of parameters corresponding to the camera; and calculating the eye location using the equation:

$$\rho = \tan\left(\frac{(l+d)\tan(\delta) - h}{l}\right) - \gamma \quad (12)$$

where $\rho$ is an angle subtended by the eye location at a center of the camera, l is a distance of the eye location from the center of the camera, d is a pre-determined distance of the center of the camera from a center of the first rear-view mirror wherein l and d are measured along a direction of motion of the vehicle, $\delta$ is a head position angle subtended by the first rear-view mirror at the eye location in a plane parallel to the direction of motion of the vehicle and perpendicular to the floor of the vehicle, h is a pre-determined distance between the center of the camera and a center of the first rear-view mirror measured along a direction perpendicular to the direction of motion of the vehicle and in a plane parallel to the plane containing $\delta$, and $\gamma$ is an angle of tilt of the camera in the plane containing $\delta$.

19. A method for detecting the location of at least one eye of a driver positioned in a driving seat of a vehicle using a single, camera positioned inside the vehicle, said method comprising:

determining a set of positional parameters corresponding to the driving seat, where said set of positional parameters includes an angle between a back-rest of the driving seat and a vertical plane, a distance between an edge of the driving seat and a center of the camera and a length of the back-rest of the driving seat;

determining a set of parameters corresponding to the camera;

capturing an image of a face of the driver using the camera; and detecting the eye location based on the set of positional parameters, the image of the face and the set of parameters corresponding to the camera; and calculating the eye location using the equation:

$$\rho = \tan^{-1}\left(\frac{u}{\sqrt{v^2 + f^2}}\right) - \gamma$$

where $\rho$ is an angle subtended by the eye location at a center of the camera, u and v are positional parameters of the eye location in the image of the face, $\gamma$ is a tilt angle of the camera and f is a focal length of the camera.

* * * * *